United States Patent
Ryu et al.

(10) Patent No.: US 9,876,223 B2
(45) Date of Patent: Jan. 23, 2018

(54) CATHODE FOR LITHIUM-SULFUR BATTERY

(71) Applicant: Hyundai Motor Company, Seoul (KR)

(72) Inventors: Hee Yeon Ryu, Gyeonggi-do (KR); Yoon Ji Lee, Gyeonggi-do (KR); Hee Jin Woo, Gyeonggi-do (KR); Sang Jin Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 89 days.

(21) Appl. No.: 14/681,722

(22) Filed: Apr. 8, 2015

(65) Prior Publication Data

US 2015/0372291 A1    Dec. 24, 2015

(30) Foreign Application Priority Data

Jun. 24, 2014    (KR) ........................ 10-2014-0077371

(51) Int. Cl.
| | | |
|---|---|---|
| *H01M 4/36* | (2006.01) | |
| *H01M 4/62* | (2006.01) | |
| *H01M 4/04* | (2006.01) | |
| *H01M 4/136* | (2010.01) | |
| *H01M 4/58* | (2010.01) | |
| *H01M 4/587* | (2010.01) | |
| *H01M 4/133* | (2010.01) | |
| *H01M 10/0525* | (2010.01) | |
| *H01M 4/1397* | (2010.01) | |

(52) U.S. Cl.
CPC ......... *H01M 4/366* (2013.01); *H01M 4/0416* (2013.01); *H01M 4/0483* (2013.01); *H01M 4/136* (2013.01); *H01M 4/1397* (2013.01); *H01M 4/5815* (2013.01); *H01M 4/625* (2013.01); *H01M 4/587* (2013.01); *H01M 10/0525* (2013.01)

(58) Field of Classification Search
CPC ........... H01M 10/0525; H01M 4/0416; H01M 4/0483; H01M 4/136; H01M 4/1397; H01M 4/366; H01M 4/5815; H01M 4/587; H01M 4/625
See application file for complete search history.

(56) References Cited

U.S. PATENT DOCUMENTS

| | | |
|---|---|---|
| 2012/0207994 A1 | 8/2012 | Wang et al. |
| 2013/0083452 A1 | 4/2013 | Chiu et al. |

FOREIGN PATENT DOCUMENTS

| | | |
|---|---|---|
| JP | 08-031451 A | 2/1996 |
| JP | 10-154527 | 6/1998 |
| JP | 10-321216 | 12/1998 |
| JP | 2008-031451 A | 2/2008 |
| KP | 10-2011-0040565 A | 4/2011 |
| KR | 2002-0039823 A | 5/2002 |
| KR | 10-0758383 B1 | 9/2007 |

(Continued)

*Primary Examiner* — Carlos Barcena
(74) *Attorney, Agent, or Firm* — Mintz Levin Cohn Ferris Glovsky and Popeo, P.C.; Peter F. Corless (57) ABSTRACT

Provided herein is a cathode for lithium-sulfur battery. The cathode for lithium-sulfur battery has a structure for improved in charge/discharge efficiency, charge capacity, and life span. In particular, in the cathode structure, an active material is inserted into a porous carbon structure and a surface of the porous carbon structure is densely coated with the conducting material thereby maximizing the contents of an active material and a conducting material in the cathode without a current collector.

5 Claims, 3 Drawing Sheets

(56) References Cited

FOREIGN PATENT DOCUMENTS

| KR | 10-2012-0000708 A | 1/2012 |
|----|-------------------|--------|
| KR | 2013-0119432 A    | 10/2013 |
| KR | 10-2014-0076161 A | 6/2014 |
| WO | 2013-078618 A1    | 6/2013 |
| WO | 2013-123131 A1    | 8/2013 |
| WO | 2013-141494 A1    | 9/2013 |

CATHODE FOR LITHIUM-SULFUR BATTERY

CROSS-REFERENCE TO RELATED APPLICATION

This application claims under 35 U.S.C. §119(a) the benefit of Korean Patent Application No. 10-2014-0077371 filed on Jun. 24, 2014, the entire contents of which are incorporated herein by reference.

TECHNICAL FIELD

The present invention relates to a cathode for lithium-sulfur battery. The cathode may have a structure for lithium-sulfur battery with improved in charge/discharge efficiency, charge capacity, and life span. In particular, the cathode may have an active material inserted into a porous carbon structure and a surface of the porous carbon structure is densely coated with a conducting material thereby maximizing the contents of an active material and a conducting material in the cathode without a current collector.

BACKGROUND

A cathode for lithium-sulfur battery has typically been manufactured by preparing a slurry in which a conducting material, an active material, a binder, and a solvent are mixed together and subsequently coating the slurry on a metal current collector.

Since typical cathode for lithium-sulfur battery has been manufactured through a precise and qualitative coating process, and contacts between conducting materials and between a conducting material and an active material may be well made. However, after manufacturing a cell, the cathode is repeatedly charged and discharged during operation, and thus, the active material may be changed. Further, due to partial loss of the active material, charge/discharge efficiency and energy efficiency may be reduced and life of the cell may also be reduced.

In order to solve such a problem, in the related arts, a technique in which sulfur, a binder, a conducting material, and a solvent are mixed in the form of slurry to manufacture a cathode for lithium-sulfur battery and then casted and dried on a metal collector has been developed to provide the electrode. However, in both of a wet method using a solvent and a dry method without using a solvent, the technique has a problem that sulfur and a conducting material may not been mixed sufficiently to have an even contact area. In particular, it has been recently reported that a cathode structure including an active material and a conducting material in a uniform manner may be loosely maintained and the initial equilibrium state may be rapidly collapsed after charge and discharge, thereby causing reduction in life span of the lithium-sulfur battery (Journal of The Electrochemical Society, 159 (8) A1226-A1229 (2012)). For example, in a cathode structure of a lithium-sulfur battery, a uniform structure in the initial state including an active material and a conducting material uniformly mixed with each other may be collapsed by repeated charge and discharge, and thus, sulfur may be eluted, thereby causing a remarkable decrease in charge/discharge capacity.

Further, in the related arts, a cathode for lithium-sulfur battery obtained by coating cathode active material slurry on a porous current collector manufactured from carbon fiber has been provided. Moreover, a method for accommodating a sulfur electrode active material within a fiber conductor by spraying a solution containing a carbon nanotube on the fiber conductor using carbon felt has been developed.

Furthermore, an electrode structure for battery has been provided. The electrode structure may include porous supporter formed of elongated fiber and contain sulfur as an active material, and pores of the porous supporter may be partially coated with a conductive material. Alternatively, a sodium-sulfur battery having a structure in which sulfur (S) as a cathode active material is impregnated in a mat formed of carbon fiber fabrics has been developed.

However, although the techniques in the related arts as described above have made some progress in improving charge/discharge efficiency or capacity by suggesting the technique for accommodating an active material within a porous current collector or supporter or a conductor in an electrode for battery, performance of the active material has not yet been fully maximized. For example, leakage of the active material to the outside of the supporter or the conductor may result in loss of the active material or a decrease in stability of conductivity.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides technical solutions to the above-described technical difficulties with the related arts. For example, in a cathode structure for lithium-sulfur battery of the present invention, an active material may be inserted into a porous carbon structure and a dense conducting material coating layer may be formed by coating a conducting material having a large specific surface area on a surface of the porous carbon structure, and thus the active material may be efficiently disposed only within the electrode and the amount of the active material may not be reduced from the electrode. Accordingly, utilization rate of the active material may be maximized, and a charge capacity may be maximized, thereby improving life span.

In one aspect, the present invention provides a cathode for lithium-sulfur battery having a novel structure. Particularly, a surface of a porous carbon structure where an active material is inserted may be coated with a conducting material.

In another aspect, the present invention provides an improved cathode for lithium-sulfur battery and the surface of the electrode may be coated with a conducting material having a large specific surface area, and thus, the amount of active material in the electrode may not be reduced, thereby maximizing a charge/discharge capacity and improving and life span of the lithium-sulfur battery.

Furthermore, in still another object, the present invention provides a method for manufacturing a cathode for lithium-sulfur battery having a structure. In particular, an active material may be inserted into a porous carbon structure and a surface of the porous carbon structure may be coated with a conducting material.

In an exemplary embodiment, a cathode for lithium-sulfur battery may include: a plate, a sulfur active material inserted into pores of a porous carbon structure on the plate thereby forming a body of the electrode; and a conducting material coating layer formed by densely coating a nanogranular conducting material on the entire surface of the porous carbon structure.

In an exemplary embodiment, a method of manufacturing a cathode for lithium-sulfur battery may include steps of: a step of manufacturing a porous carbon structure on a plate to form a body of the cathode; a step of forming a conducting material coating layer on five surfaces of the carbon structure except one surface by coating a nanogranular conducting material densely on the five surfaces; a step of inserting a sulfur active material into the carbon structure of which the five surfaces are coated with the conducting material; a step of drying the carbon structure into which the active material is inserted; and a step of forming a conducting material coating layer on an uncoated surface of the carbon structure by densely coating the conducting material on the uncoated surface.

Further provided are vehicles that comprise the lithium-sulfur battery as described herein.

As such, since a surface of the electrode is coated with a conducting material having excellent electrical conductivity, the cathode for lithium-sulfur battery according to various aspects of the present invention may stably maintain electrical conductivity within the electrode even under volume expansion conditions. Further, when a polysulfide generated is dissolved in an electrolyte during the use of the cathode, dispersion of the polysulfide within the electrode and the cell may be suppressed and also reactivity between the polysulfide and the conducting material may be improved.

Accordingly, due to such a structural characteristic, instead of a conventional current collector, a conducting material coating layer formed by densely coating a conducting material on a surface of a carbon structure may stably maintain conductivity, and serve as a current collector. Consequently, the cell may have greatly improved charge/discharge efficiency, life span, capacity, and energy density.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the FIGS. 1-3 include reference to the following elements as further discussed below:

11—Carbon structure
11a—Fiber
12—Sulfur active material
13—Conducting material
14—Conducting material coating layer It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention relates to a cathode for lithium-sulfur battery having a structure in which an active material may be inserted into a porous carbon structure of a plate forming a body of the cathode and a conducting material may be densely coated on the entire outer surface of the porous carbon structure where the active material is inserted. As such, the active material may be present only within the carbon structure of the electrode, thereby maximizing a utilization rate of the active material.

In the present invention, the carbon structure constituting the body of the cathode may be manufactured from carbon fiber, and may be a felt formed of one or more selected from carbon fiber or various fabrics having micro pores, for example, woven carbon fiber, carbon fabric, and carbon fiber cloth. The carbon structure may be formed into a plate having the same shape of body of the cathode, and may have the porosity of about 30 to 90%.

Suitable sulfur active materials include for example electrochemically active materials that comprise, consist essentially or consist of: elemental sulfur, a metal sulfide (e.g. an alkali metal sulfide), a metal polysulfide, and combinations thereof. Various suitable sulfur active materials for use in battery cathodes systems have been reported. A particularly preferred sulfur active material is set forth in Example 1, which follows.

In preferred systems, the sulfur active material may be inserted into pores and contained within pores of the porous carbon structure. The active material may be uniformly disposed within pores of a porous carbon structure. For example, the active material may be attached or coated between carbon structures or may fill the pores. Within the pores of the porous carbon structure, a typically used conducting material, a binder, or both may be further contained in addition to the active material. Particularly, the conducting material may be, but not limited to, one or more selected from the group consisting of carbon nanofibers such as vapor-grown carbon nanofibers and VGCF, super carbon (Super C), Ketjen Black, and carbon fibers (carbon nanotube). The binder may include one or more selected from the group consisting of PVDF (polyvinylidene fluoride), PVdF-co-HFP (polyvinylidene fluoride Co—hexafluoropropylene), SBR-CMC (styrene butadiene rubber—carboxymethyl cellulose), PVA (polyvinyl alcohol), and PTFE (polytetrafluoroethylene).

The conducting material coating layer may be densely coated with a nanogranular conducting material on the entire surface of the carbon structure. The nanogranular conducting material applied as the conducting material coating layer may include one or more selected from Ketjen Black and super carbon (Super C), without limitation. In particular, the conducting material may be formed into nanoparticles having a large specific surface area and may have a particle size of about 20 to about 100 nm, or particularly of about 30 to about 40 nm.

The conducting material coating layer may be coated on the entire surface of the carbon structure to a thickness of about 1 to about 30 μm, or particularly of about 5 to about 15 μm. Each conducting material coating layer on each surface of the carbon structure may have the same composition and thickness. Alternatively, each conducting material coating layer on each surface of the carbon structure may have different composition and thickness.

The conducting material coating layer may be "densely" coated on the each surface of the carbon structure. As used herein, the term "densely coated" refers to a state in which the nanogranular conducting material is coated to the extent that when the active material contained within the carbon structure is dissolved in an electrolyte and dispersed within the electrode and the cell, leakage of the active material to the outside of the surface of the carbon structure of the cathode is at least substantially or effectively completely prevented. Thus, the determination of "densely coated can be determined by simple testing.

Figure 1:
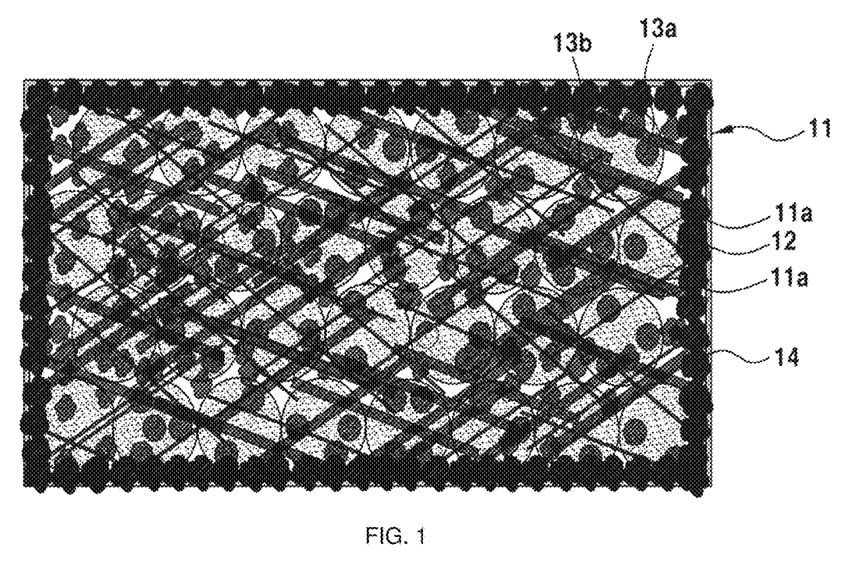
FIG. 1 illustrates an exemplary structure of an exemplary cathode for an exemplary lithium-sulfur battery according to an exemplary embodiment of the present invention.

The cathode for lithium-sulfur battery a may have a typical cross-sectional structure as shown in FIG. 1. FIG. 1 illustrates an exemplary structure example in which a sulfur active material 12 and conducting materials 13a and 13b are uniformly distributed within pores formed of fiber 11a of a carbon structure 11 forming a body of a cathode. In particular, FIG. 1 shows a sealing effect from which the structure capable of preventing leakage of the active material 12 to the outside by a conducting material coating layer 14 when the active material 12 is dissolved in an electrolyte. The sealing effect may be obtained from the conducting materials coated on a surface of the carbon structure 11 and the conducting material coating layer 14 formed thereon with.

A method of manufacturing a cathode for lithium-sulfur battery will be explained as follows with reference to an exemplary embodiment.

The method may include steps of: a step of manufacturing a porous carbon structure on a plate to form a body of the cathode; a step of forming a conducting material coating layer on five surfaces of the carbon structure except one surface by coating a nanogranular conducting material densely on the five surfaces; a step of inserting a sulfur active material into the carbon structure of which the five surfaces are coated with the conducting material; a step of drying the carbon structure into which the active material is inserted; and a step of forming a conducting material coating layer on an uncoated surface of the carbon structure by densely coating the conducting material on the uncoated surface.

In a step of preparing a porous carbon structure on a plate to form a body of a cathode, a porous carbon structure manufactured from carbon felt or fibers as described above may be used. The carbon structure may be manufactured, without limitation, by a reaction template method, a gas foaming method, or particularly by a sacrificial template method. Further, the porous carbon structure may serve as a body forming the cathode, the porous carbon structure may be manufactured according to a size and a thickness of the cathode.

Subsequently, a step of forming a conducting material coating layer may be performed. The conducting material coating layer may be coated on five surfaces of the prepared carbon structure except one surface by densely coating a nanogranular conducting material. In particular, among the six surfaces of the carbon structure, the largest surface may remain uncoated for a process of inserting the active material such that difficulty in the process when an active material to be inserted and contained into the carbon structure may be reduced. As such, the five of the six surfaces may be coated with the conducting material thereby forming the conducting material coating layer. The uncoated surface on which the conducting material coating layer is not formed may have the largest surface area in order for the active material to be inserted. In FIG. 2, the first diagram shows that an exemplary conducting material coating layer is formed on the five surfaces of the carbon structure except the one surface. In addition, in the step of coating the conducting material, a conducting material coating layer may be formed on the five surfaces of the carbon structure by, for example, but not limited thereto, a casting method and an aerosol deposition method by coating a nanogranular conducting material on the surfaces. The conducting material coating layer may be formed in a thickness of about 1 to about 20 μm, or particularly of about 5 to about 15 μm.

As described above, after the conducting material coating layer is formed on the five surfaces of the carbon structure, a sulfur active material may be inserted into the carbon structure. In particular, the sulfur active material may be inserted by a slurry impregnation method or a melting method, but the method is not limited thereto.

When a slurry impregnation method is used, slurry may contain a sulfur active material and a conducting material to be inserted. The slurry may be the above-described slurry in which a binder and an NMP (N-Methyl Pyrrolidone) solvent may be further mixed. In an exemplary embodiment of the present invention, slurry in which sulfur and a conducting material may be mixed at a weight ratio of about 6:4 to about 9:1. Moreover, the slurry may include a sulfur, a conducting material, and a binder which may be mixed at a weight ratio of about 6:2:2 to about 7:2:1 for impregnation of the active material.

When impregnating the slurry in the carbon structure, viscosity of the slurry to be impregnated may be in a range of about 500 to about 5000 cps and a pressure may be applied. The pressure within the carbon structure may be in a range of about 1.2 to about 2.6 MPa. Particularly, when the pressure is applied within the above-mention range, the active material and the conducting material may easily and uniformly permeate into pores of the carbon structure made of felt in a reduced time, and thus the active material and the conducting material may be uniformly dispersed and impregnated.

When a melting method is used instead of the slurry impregnation method, a sulfur active material or a mixture of a sulfur active material and a conducting material may be injected as being melted without using a binder or may be injected in liquid form. Alternatively, an electrolyte dissolving polysulfide (PS) or sulfur may be inserted into the carbon structure.

The electrolyte may include one or more selected from DME (dimethyl ether), TEGDME (triethylene glycol dimethyl ether), and dioxolane. Further, a binder may be further included in the mixture in addition to the sulfur active material.

When the melting method is used, the active material may be injected into the carbon structure for more than one times at a temperature of about 140° C. to about 250° C. at a pressure of about 1.5 MPa to about 2.0 MPa.

When the active material is inserted into the carbon structure, a drying step may follow. In the drying step, the carbon structure into which the active material is inserted may be slowly dried using a drier such as a hot air drier or the like, and may be dried, for example, at a temperature of about 40° C. to about 80° C. for about 8 to about 18 hours.

When the carbon structure is dried, a conducting material coating layer may be formed on the uncoated surface by densely coating the conducting material. The step of coating the conducting material coating layer formed on the uncoated surface may be formed by the same coating method as described above. In particular, the formed conducting material coating layer may have the same composition or thickness of the already formed conducting material coating layer on the five surfaces within the above-described composition and thickness ranges. Alternatively, the formed the formed conducting material coating layer may have different composition or thickness from the already formed conducting material coating layer on the five surfaces.

Figure 2:
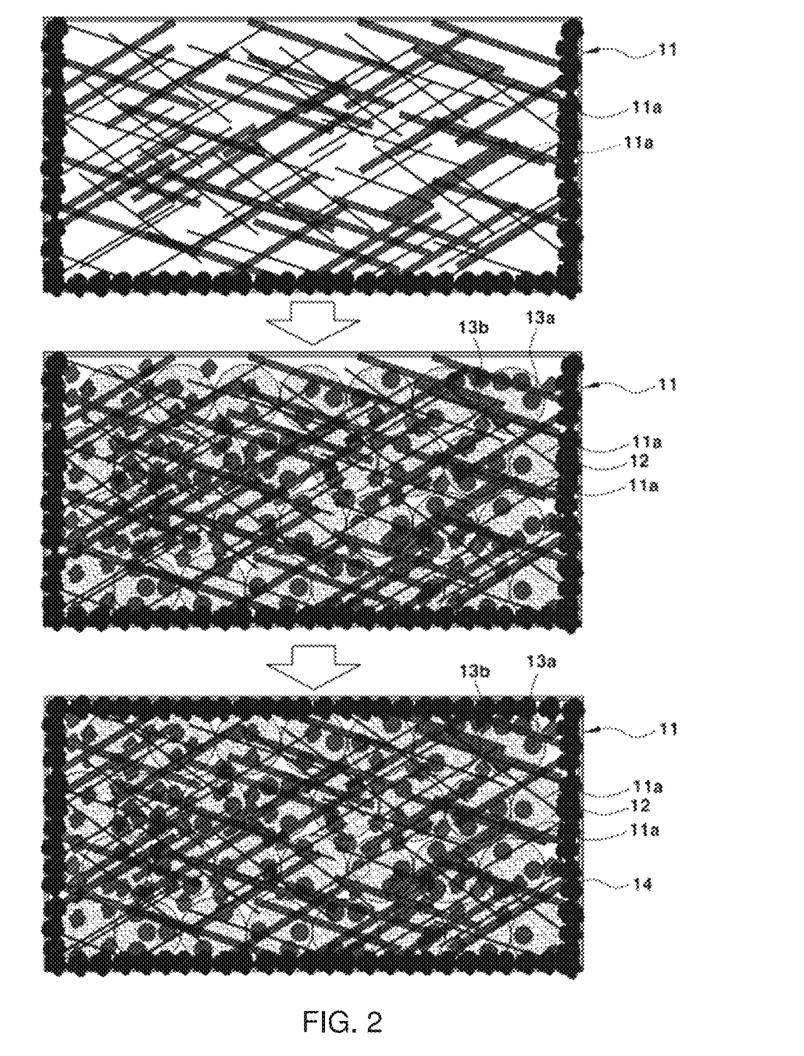
FIG. 2 illustrates an exemplary manufacturing process according to an exemplary embodiment of the present invention where (1) an exemplary conducting material coating layer is formed on five surfaces of an exemplary carbon structure during the manufacturing process of an exemplary cathode for lithium-sulfur battery, (2) the carbon structure after an active material is injected into the structure, and (3) an exemplary final electrode structure after the conducting material coating layer is finally formed on the other one surface in order.
Figure 3:
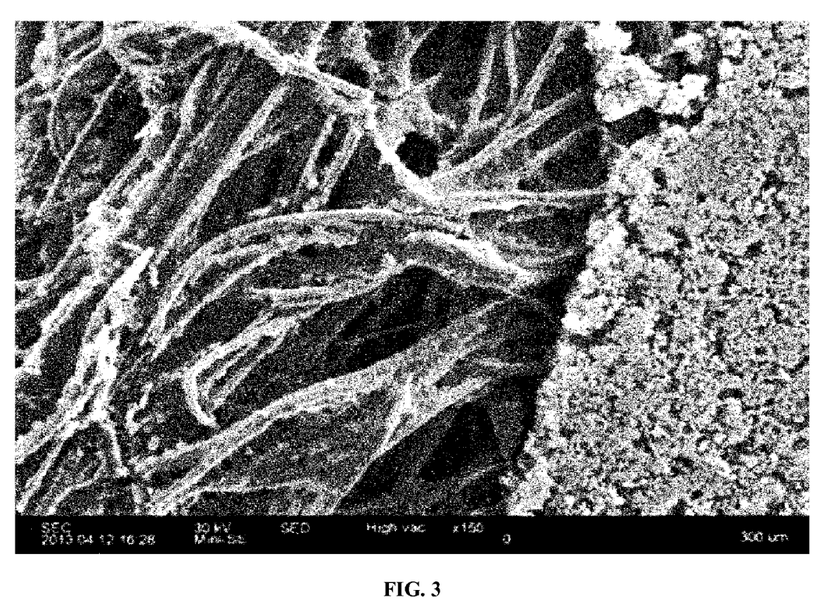
FIG. 3 shows a scanning electronic microscope (SEM) image of an exemplary carbon structure of an exemplary cathode for an exemplary lithium-sulfur battery manufactured according to an exemplary embodiment of the present invention and shows an exemplary structure of an exemplary conducting material coating layer formed on a surface of the carbon structure.

FIG. 2 shows that an exemplary manufacturing process where an exemplary carbon structure may have a conducting material coating layer formed on the five surfaces, and the carbon structure after an active material may be injected into the structure, and a final electrode structure after a conducting material coating layer may be finally formed on the last uncoated surface.

As described above, the cathode for lithium-sulfur battery manufactured according to various exemplary embodiment of the present invention may provide advantageous effects such as sealing the entire surface with a conducting material having excellent electrical conductivity even under changed volume expansion conditions where a polysulfide is generated through a reaction between sulfur and lithium in a conventional lithium-sulfur battery. Accordingly, electrical conductivity may maintain stably within the electrode. Further, when the polysulfide is dissolved in an electrolyte, the cathode may suppress dispersion or leaking of the polysulfide within the electrode and the cell to the outside and prevent collapse of the initial structure. Furthermore, the cathode may have improved reactivity of the polysulfide dissolved in the electrolyte by using a large specific surface area of a conducting material coating layer coated on the surface of the carbon structure.

In addition, during charging, the cathode structure of the present invention may provide improved charge efficiency since the polysulfide dissolved in the electrolyte is substantially reactive with a conducting material having a large specific surface area and coated on the surface of the carbon structure, and may stably maintain conductivity by densely coating the conducting material on the surface of the carbon structure and thus serve as a current collector instead of a conventional current collector. Moreover, since the conducting material coating layer formed on the surface of the electrode has improved electrical conductivity, the structure may also be advantageous in charging.

Therefore, the cathode for lithium-sulfur battery according to various exemplary embodiments of the present invention may reduce loss of the sulfur active material and maximally utilize the active material based on the above-described effects, and thus a cell may be improved in all of charge/discharge efficiency, life span, capacity, and energy density.

With the above-described cathode for lithium-sulfur battery of the present invention, a cell for lithium-sulfur battery may be manufactured by any methods generally known in the arts. The lithium-sulfur battery including an electrode having a novel structure of the present invention as a cathode may have charge/discharge efficiency of about 98% or greater.

Accordingly, the present invention includes a lithium-sulfur battery including the cathode for lithium-sulfur battery according to the present invention.

The lithium-sulfur battery including the cathode structure according to exemplary embodiments of the present invention may be applied to vehicles.

EXAMPLES

The following examples illustrate the invention and are not intended to limit the same.

Example 1

A carbon structure (50 mm×50 mm×0.2 mm) for manufacturing an electrode was prepared by cutting a carbon structure having a porosity of about 87%, which was purchased from JNTG, South Korea.

The prepared carbon structure was coated with nanogranular Ketjen Black having a particle size of about 30 nm by a casting method to form a coating layer on the five surfaces except the front surface and the coating layer had a thickness of about 10 μm as shown in FIG. 2.

Within the carbon structure of which the five surfaces were coated with the conducting material, slurry containing a sulfur and a conducting material was impregnated. The sulfur had a spherical shape and had a sized of about 3 μm in diameter. The sulfur in the slurry was inserted in to pores of the prepared carbon structure. The sulfur and the conducting material (CNT) were present in the form of slurry together with a PVDF binder dissolved in NMP. The mixture was formed into slurry containing the sulfur, the conducting material (CNT), and the PVDF at a weight ratio of about 6:2:2 and adjusted to have a viscosity of about 1000 cps. The slurry was impregnated in the carbon structure at a pressure within the carbon structure of about 1.5 MPa.

The carbon structure in which the sulfur active material was impregnated as described above was dried by a hot air drier at a temperature of about 60° C. for about 12 hours. The other one surface of the dried carbon structure was densely coated to have a thickness of about 10 μm using nanogranular Ketjen Black as described above, and thus, a cathode for lithium-sulfur battery was manufactured.

Experimental Example 1

A scanning electronic microscope (SEM) was used to provide a microscopic view of the conducting material coating layer formed on the surfaces of the cathode for lithium-sulfur battery manufactured in Example 1. As shown in FIG. 3, the sulfur active material may be contained in a sparse region within the carbon structure as shown on the left picture of FIG. 3 and the conducting material coating layer may be densely formed on a surface region as shown on the right picture of FIG. 3.

Experimental Example 2

Cells were manufactured by respectively using the electrodes manufactured in the above Examples and Comparative Examples as cathodes through a conventional manufacturing method of a lithium-sulfur battery cell for evaluation. The charge/discharge life span and properties such as charge/discharge efficiency and the like were measured. The results were as shown in Table 2.

TABLE 2

| Measurement item | Example 1 | Example 2 | Example 3 | Example 4 | Comparative Example 1 | Comparative Example 2 |
|---|---|---|---|---|---|---|
| Life span evaluation (based on capacity after charging/discharging 30 times) | 980 mAh/$g_s$ | 960 mAh/$g_s$ | 1020 mAh/$g_s$ | 970 mAh/$g_s$ | 830 mAh/$g_s$ | 800 mAh/$g_s$ |

Examples 2 to 4

Each cathode for lithium-sulfur battery was manufactured as described in Example 1 but a different kind of a conducting material and a different coating method as shown in Table 1 below were used.

Comparative Example 1

A cathode for lithium-sulfur battery was manufactured by a conventional casting method using sulfur, a conducting material (VGCF), and PVDF at a weight ratio of about 6:2:2 on an aluminum current collector.

Comparative Example 2

A cathode for lithium-sulfur battery was manufactured as described in Example 1 but a conducting material was changed.

From the results as shown in Table 2, in the cell using a conducting material coating layer, performance thereof was improved in by at least about 17%.

A cathode for lithium-sulfur battery according to various exemplary embodiments of the present invention may be used as a novel cathode for a lithium-sulfur battery with improved charge/discharge efficiency and extended life as compared to a conventional one. In particular, a lithium-sulfur battery using the cathode for lithium-sulfur battery of the present invention can be applied to vehicles.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

TABLE 1

| Composition | Example 1 | Example 2 | Example 3 | Example 4 | Comparative Example 1 | Comparative Example 2 |
|---|---|---|---|---|---|---|
| Carbon structure layer | Carbon fiber | Carbon fiber | Carbon fiber | Carbon fiber | — | — |
| Coating layer material | Ketjen Black | Ketjen Black | Super C | Super C | — | — |
| Coating method | Casting | Aerosol Deposition | Casting | Aerosol Deposition | — | — |
| Cathode and Binder | Sulfur PVDF | Sulfur PVDF | Sulfur PVDF | Sulfur PVDF | Sulfur PVDF | Sulfur PVDF |
| Conducting material | VGCF | VGCF | Super C | Super C | VGCF | Super C |

What is claimed is:

1. A method of manufacturing a cathode for lithium-sulfur battery, comprising steps of:
- a step of manufacturing a porous carbon structure on a plate;
- a step of forming a conducting material coating layer on five surfaces of the carbon structure except one surface by densely coating a nanogranular conducting material on the five surfaces;
- a step of inserting a sulfur active material into the carbon structure of which the five surfaces are coated with the conducting material;
- a step of drying the carbon structure into which the active material is inserted; and
- a step of forming a conducting material coating layer on an uncoated surface by densely coating the conducting material on the uncoated surface.

2. The method of claim 1, wherein the conducting material coating layer is formed by a casting method or an aerosol deposition method.

3. The method of claim 1, wherein the active material is inserted by a slurry impregnation method or a melting method.

4. The method of claim 1, wherein in the step of inserting the sulfur active material, a conducting material, a binder, or both are inserted in addition to the active material.

5. The method of claim 1, wherein the step of drying is carried out at a temperature of about 40° C. to about 80° C. for about 8 to about 18 hours.

* * * * *